United States Patent
Jung

(10) Patent No.: US 11,559,901 B2
(45) Date of Patent: Jan. 24, 2023

(54) ROBOT, RECORDING MEDIUM IN WHICH PROGRAM FOR PERFORMING SERVICE PROVIDING METHOD THEREOF IS RECORDED, AND MOBILE TERMINAL CONNECTED TO SAME

(71) Applicant: LG ELECTRONICS INC., Seoul (KR)

(72) Inventor: Jaeduck Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1004 days.

(21) Appl. No.: 16/328,554

(22) PCT Filed: Aug. 28, 2017

(86) PCT No.: PCT/KR2017/009376
§ 371 (c)(1),
(2) Date: Feb. 26, 2019

(87) PCT Pub. No.: WO2018/044015
PCT Pub. Date: Mar. 8, 2018

(65) Prior Publication Data
US 2021/0276199 A1    Sep. 9, 2021

(30) Foreign Application Priority Data
Aug. 30, 2016    (KR) .................. 10-2016-0111032

(51) Int. Cl.
*B25J 11/00*    (2006.01)
*H04W 76/10*    (2018.01)
(Continued)

(52) U.S. Cl.
CPC ........... *B25J 11/008* (2013.01); *B25J 9/0003* (2013.01); *H04M 1/724* (2021.01); *H04W 76/10* (2018.02)

(58) Field of Classification Search
CPC . B25J 11/008; B25J 9/0003; B25J 9/16; B25J 9/1669; B25J 9/1679; B25J 19/023;
(Continued)

(56) References Cited

U.S. PATENT DOCUMENTS 7,188,139 B1 * 3/2007 Ayatsuka .............. G06F 1/1686
709/227
7,991,194 B2 * 8/2011 Kim ........................ H04L 67/52
348/135
(Continued)

FOREIGN PATENT DOCUMENTS

KR    10-2008-0090150       10/2008
KR       20080090150 A  * 10/2008
(Continued)

OTHER PUBLICATIONS

International Search Report (with English Translation) and Written Opinion dated Nov. 30, 2017 issued in Application No. PCT/KR2017/009376.

*Primary Examiner* — Khoi H Tran
*Assistant Examiner* — Nhi Q Bui
(74) *Attorney, Agent, or Firm* — KED & Associates, LLP

(57) ABSTRACT

A robot comprises: a display unit; a user input unit for receiving a request for providing a first service from a first user; a communication unit for connection to a first mobile terminal of a second user; and a control unit for controlling the display unit such that the same displays a screen including first data for providing the first service, in response to the request for providing the first service, receiving a request for providing a second service from the first mobile terminal, and transmitting, to the first mobile terminal, second data for providing the second service, in response to the received request for providing the service second service.

4 Claims, 12 Drawing Sheets

(51) Int. Cl.
*H04M 1/724* (2021.01)
*B25J 9/00* (2006.01)

(58) Field of Classification Search
CPC ........ B25J 13/06; H04W 76/10; H04M 1/724; H04M 1/72412; H04M 1/0264
See application file for complete search history.

(56) References Cited

U.S. PATENT DOCUMENTS

| | | | |
|---|---|---|---|
| 2014/0006631 A1* | 1/2014 | Meskauskas | H04W 4/21 |
| | | | 709/227 |
| 2014/0126460 A1* | 5/2014 | Bienas | H04W 74/002 |
| | | | 370/315 |
| 2015/0120046 A1* | 4/2015 | Kim | B25J 9/163 |
| | | | 700/250 |
| 2016/0098101 A1* | 4/2016 | Park | H04N 5/2628 |
| | | | 345/634 |

FOREIGN PATENT DOCUMENTS

| | | | |
|---|---|---|---|
| KR | 10-0904191 | 6/2009 | |
| KR | 10-2011-0103537 | 9/2011 | |
| KR | 10-2015-0028152 | 3/2015 | |
| KR | 10-2015-0081043 | 7/2015 | |
| KR | 20150081043 A * | 7/2015 | |
| WO | WO-2008069365 A1 * | 6/2008 | ............... A63H 3/28 |

\* cited by examiner

CONNECTED TO FIRST ROBOT

ROBOT, RECORDING MEDIUM IN WHICH PROGRAM FOR PERFORMING SERVICE PROVIDING METHOD THEREOF IS RECORDED, AND MOBILE TERMINAL CONNECTED TO SAME

CROSS-REFERENCE TO RELATED PATENT APPLICATIONS

This application is a U.S. National Stage Application under 35 U.S.C. § 371 of PCT Application No. PCT/KR2017/009376, filed Aug. 28, 2017, which claims priority to Korean Patent Application No. 10-2016-0111032, filed Aug. 30, 2016, whose entire disclosures are hereby incorporated by reference.

TECHNICAL FIELD

The present invention relates to an airport robot for providing airport related services to a plurality of users, a recording medium having recorded thereon a program for performing a service provision method thereof, and a mobile terminal connected to the airport robot.

BACKGROUND ART

Recently, introduction of robots has been discussed in order to more efficiently provide various services to users in public places such as airports. The users may use various services such as an airport route guidance service, a boarding information guidance service and a multimedia content provision service through robots disposed in an airport.

However, since high-tech devices such as robots are expensive, the number of airport robots disposed in the airport may be limited. Accordingly, it is inconvenient for a plurality of users to wait for a long time to use the airport robot.

Meanwhile, mobile terminals (e.g., camera phones, smartphones, etc.) having cameras mounted therein or digital image capturing devices such as digital camcorders or digital cameras have been increasingly used.

Such image capturing devices generally provide a preview function. The preview function refers to a function for displaying images projected on a lens in real time like a series of continuous images such that a user presses a shutter to select a predetermined screen.

Technology for providing information on an object included in a preview image or an object within a predetermined distance is being developed. Such technology is referred to as augmented reality technology. Augmented reality means that a real-world image is mixed with information by inserting information related to a real-world environment into the real-world environment.

Augmented reality allows users to more easily acquire information related to a real world.

Since many users carry such mobile terminals, there is a need for a method of allowing a plurality of users to receive services from airport robots using mobile terminals.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1:
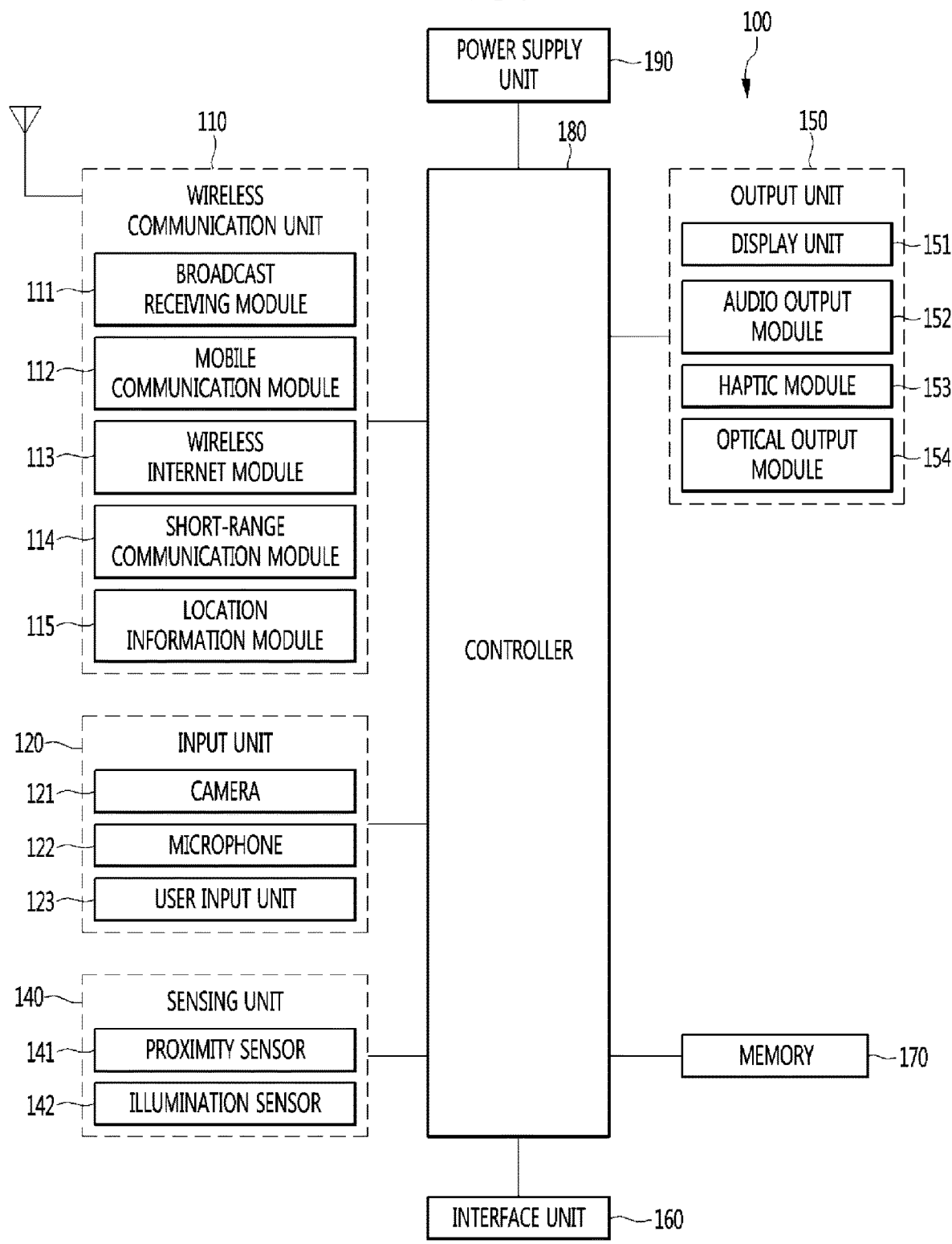
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit (or communication interface) 110, an input unit (or user input interface) 120, a sensing unit 140, an output unit 150, an interface unit 160, a memory 170, a controller 180, and a power supply unit 190.

It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like.

For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit (or display) 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite.

As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
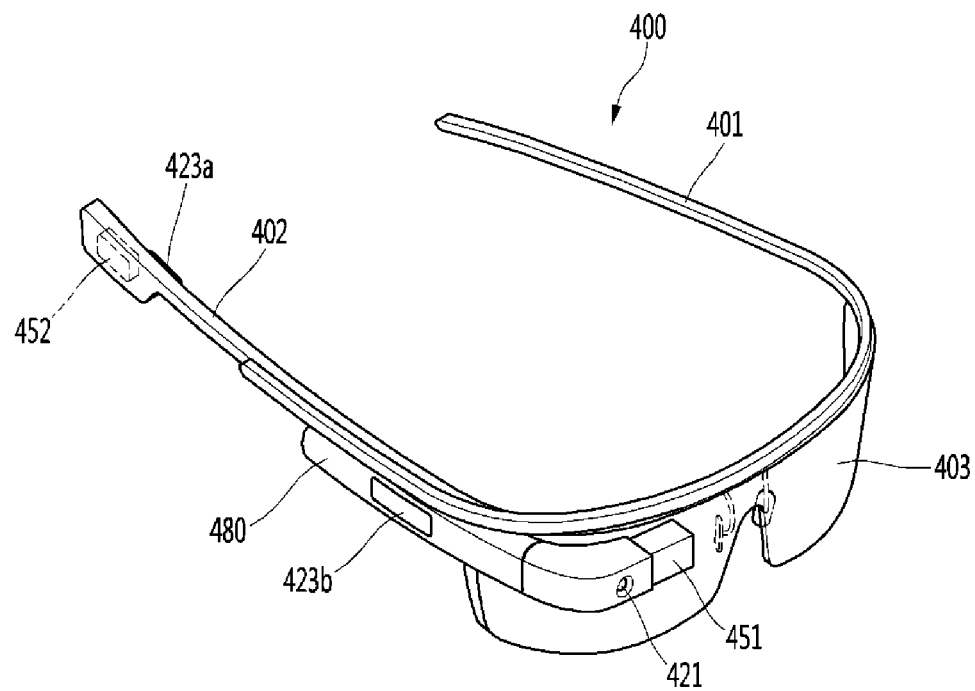
FIG. 2 is a perspective view illustrating one example of a glass-type mobile terminal according to another exemplary embodiment.

FIG. 2 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIG. 1.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 2 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 2 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power(RSRP), reference signal received quality(RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P(Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 3:
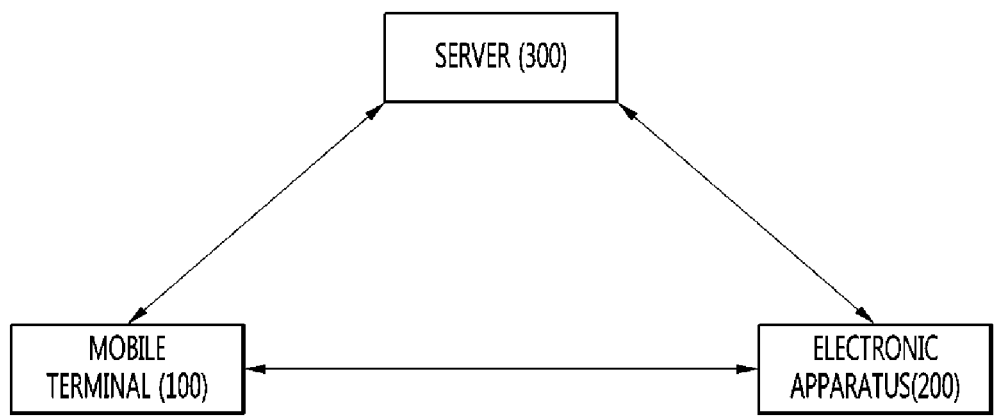
FIG. 3 is a diagram illustrating the configuration of an augmented reality system according to an embodiment of the present invention.

FIG. 3 is a diagram illustrating the configuration of an augmented reality system according to an embodiment of the present invention.

The augmented reality system according to the embodiment of the present invention may include a mobile terminal 100, an electronic apparatus 200 and a server 300.

The operation mode of the mobile terminal 100 may include an augmented reality mode. The augmented reality mode may be a mode for providing a real-world image with information related to the real-world image.

The mobile terminal 100 may enter the augmented reality mode according to execution of an application installed therein. Upon entering the augmented reality mode, the mobile terminal 100 may automatically display a preview image acquired through the camera 121 on the display unit 151.

The mobile terminal 100 may identify the electronic apparatus through the preview image and provide information on the identified electronic apparatus 200.

In one embodiment, the controller 180 of the mobile terminal 100 may identify the electronic apparatus 200 using an image recognition method. The controller 180 of the mobile terminal 100 may identify the electronic apparatus 200 based on the preview image of the electronic apparatus 200 acquired through the camera 121.

The preview image show an image to be captured through the camera 121 in advance. The controller 180 may acquire the external image of the electronic apparatus 200 included in the preview image and compare the acquired external image of the electronic apparatus 200 with the external images of the electronic apparatuses in the memory 170 of the mobile terminal 100.

When the acquired external image of the electronic apparatus 200 is stored in the memory 170 as the result of comparison, the controller 180 may extract stored information on the electronic apparatus. The information on the electronic apparatus may be one or more of a name of the electronic apparatus, a model name of the electronic apparatus, information on parts provided in the electronic apparatus, image information of the parts, and position information of parts in the electronic apparatus.

When the external image of the electronic apparatus 200 is not stored in the memory 170 as the result of comparison, the controller 180 may access the server 300 including the database of the electronic apparatus through the wireless Internet module 113. The server 300 may identify the electronic apparatus 200 through comparison between the external image of the electronic apparatus 200 from the database and the stored external images of the electronic apparatuses.

The controller 180 may receive information on the electronic apparatus 200 identified by the server 300.

In another embodiment, the controller 180 may identify the electronic apparatus 200 based on an identifier attached to the electronic apparatus 200. The identifier may be any one of a barcode, a QR code and an RFID and may include information for identifying the electronic apparatus 200.

The controller 180 may recognize the identifier included in the preview image acquired through the camera 121 to identify the electronic apparatus 200.

In another embodiment, the controller 180 may identify the electronic apparatus 200 based on the position information of the mobile terminal 100. Specifically, the controller 180 may identify the electronic apparatus 200 displayed in the preview image through comparison between the position information of the mobile terminal 100 and the position information of the electronic apparatus 200.

Although GPS information is preferably used as the position information, it may be difficult to acquire GPS information in a room. The controller 180 may use a Wi-Fi Position Service (WPS) method using the wireless Internet, a method of using Bluetooth, a method of using an RFID, etc.

The short-range communication module 114 of mobile terminal 100 may perform short-range wireless communication with the electronic apparatus 200. The electronic apparatus 200 may include a short-range communication module.

The electronic apparatus 200 may be any one of an airport robot, a refrigerator, a washing machine, a TV, an electronic oven, a cleaner and an airport robot, but is merely an example.

The server 300 may exchange information with the mobile terminal 100 through the Internet.

In some cases, the server 300 may be connected to the electronic apparatus 200 through wireless communication. In this case, the electronic apparatus 200 may also include a wireless Internet module.

Figure 4:
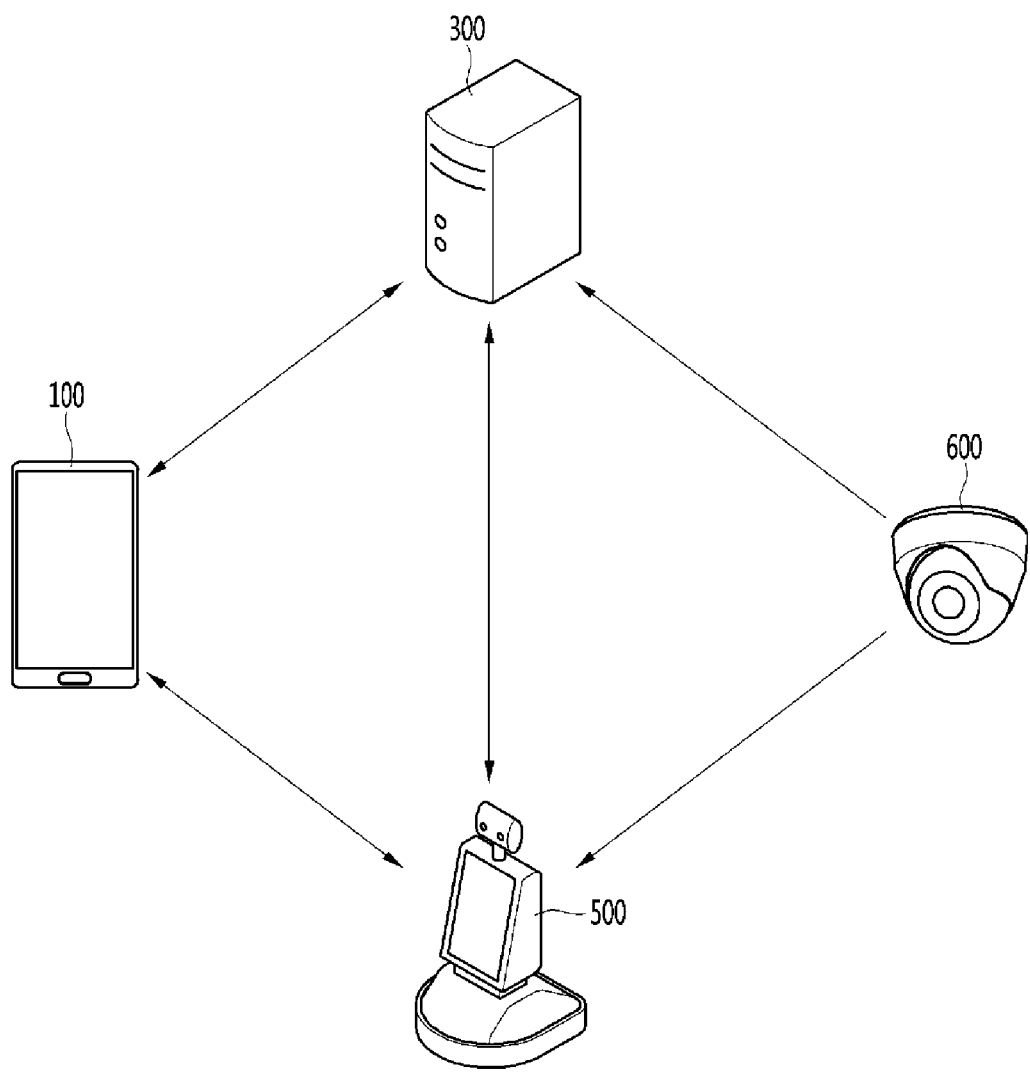
FIG. 4 is a diagram illustrating the structure of an airport robot system according to an embodiment of the present invention.

FIG. 4 is a diagram illustrating the structure of an airport robot system according to an embodiment of the present invention.

The airport robot system according to the embodiment of the present invention may include a mobile terminal 100, a server 300, an airport robot 500 (a robot for an airport) and a camera 600.

The mobile terminal 100 may transmit and receive data to and from the server 300 in the airport. For example, the mobile terminal 100 may receive airport related data such as a flight time schedule, an airport map, etc. from the server 300. A user may receive necessary information of the airport from the server 300 through the mobile terminal 100. In addition, the mobile terminal 100 may transmit data such as a photo, a moving image, a message, etc. to the server 300. For example, the user may transmit the photograph of a missing child to the server 300 to report the missing child or photograph an area of the airport where cleaning is required through the camera 121 to request cleaning of the area.

In addition, the mobile terminal 100 may transmit and receive data to and from the airport robot 500.

For example, the mobile terminal 100 may transmit, to the airport robot 500, a signal for calling the airport robot 500, a signal for instructing that specific operation is performed, or an information request signal. The airport robot 500 may move to the position of the mobile terminal 100 or perform operation corresponding to the instruction signal in response to the call signal received from the mobile terminal 100. Alternatively, the airport robot 500 may transmit data corresponding to the information request signal to the mobile terminal 100 of the user.

Next, the airport robot 500 may perform patrol, guidance, cleaning, disinfection and transportation within the airport.

The airport robot 500 may transmit and receive signals to and from the mobile terminal 100 or the server 300. For example, the airport robot 500 may transmit and receive signals including information on the situation of the airport to and from the server 300. In addition, the airport robot 500 may receive image information of the areas of the airport from the camera 600 in the airport. Accordingly, the airport robot 500 may monitor the situation of the airport through the image information captured by the airport robot 500 and the image information received from the camera 600.

The airport robot 500 may directly receive a command from the user. For example, a command may be directly received from the user through input of touching the display unit provided in the airport robot 500 or voice input. In addition, as described above, the airport robot 500 may receive a command from the mobile terminal 100 connected to the airport robot 500.

The airport robot 500 may perform patrol, guidance, cleaning, etc. according to the command received from the user, the mobile terminal 100 or the server 300.

Next, the server 300 may receive information from the mobile terminal 100, the airport robot 500 and the camera 600. The server 300 may collect, store and manage the information received from the devices. The server 300 may transmit the stored information to the mobile terminal 100 or the airport robot 500. In addition, the server 300 may transmit command signals to a plurality of the airport robots 500 disposed in the airport.

The camera 600 may include a camera installed in the airport. For example, the camera 600 may include a plurality of closed circuit television (CCTV) cameras installed in the airport, an infrared thermal-sensing camera, etc. The camera 600 may transmit the captured image to the server 300 or the airport robot 500.

Figure 5:
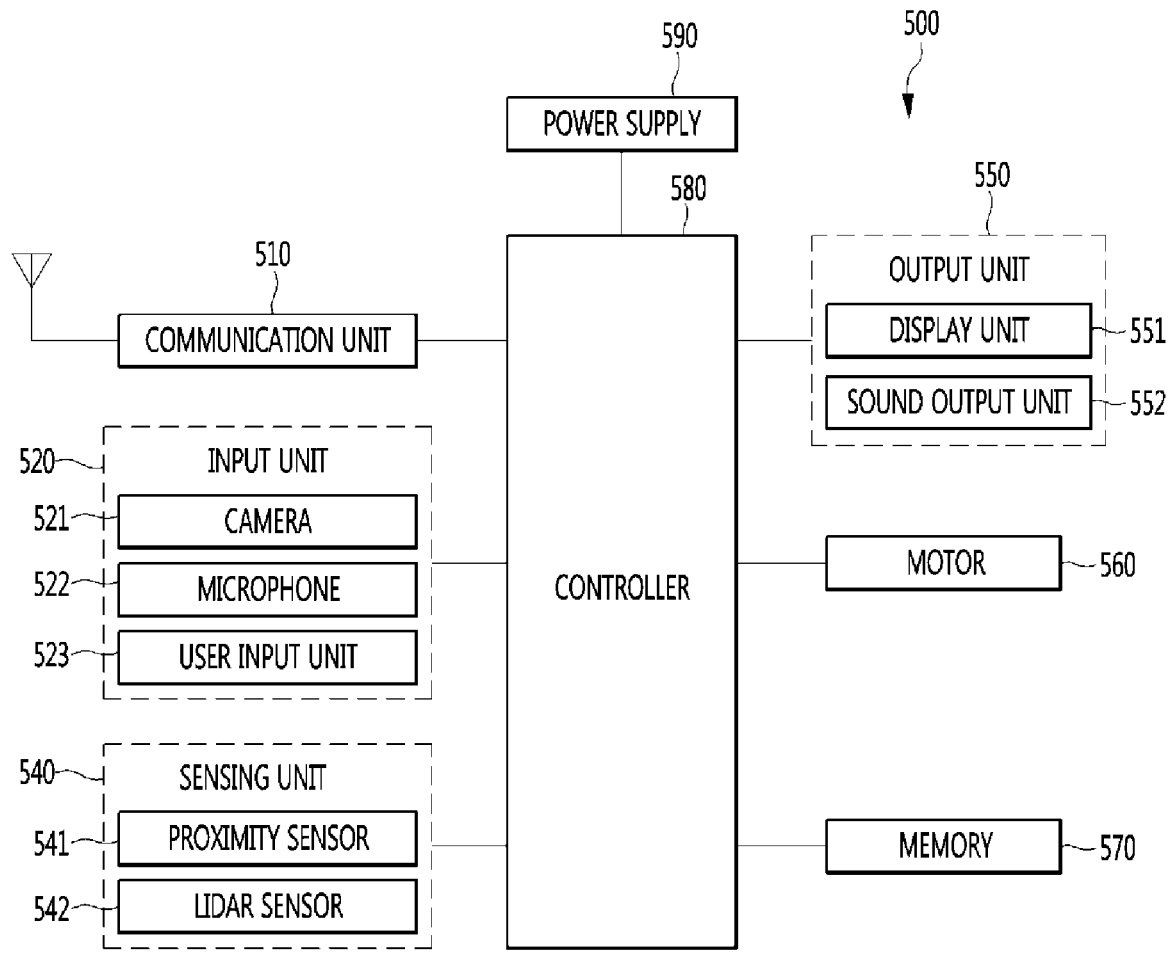
FIG. 5 is a schematic block diagram of an airport robot according to an embodiment of the present invention.

FIG. 5 is a schematic block diagram of an airport robot according to an embodiment of the present invention.

Referring to FIG. 5, the airport robot 500 may include a communication unit 510, an input unit 520, a sensing unit 540, an output unit 550, a controller 580 and a power supply 590. The components shown in FIG. 5 are not essential to implement the airport robot and the airport robot described in this specification may have more or fewer components than those listed above.

In addition, some components shown in FIG. 5 are similar to some components of the mobile terminal 100 described above with reference to FIG. 1 and thus the functions of the components of FIG. 5 will be focused upon.

The communication unit 510 may include one or more modules capable of performing wireless communication between the airport robot 500 and the server 300, between the airport robot 500 and the mobile terminal 100, or between the airport robot 500 and another airport robot. For example, the communication unit 510 may include at least one of a mobile communication module, a wireless Internet module, a short-range communication module and a position information module.

In particular, the airport robot 500 according to the embodiment of the present invention may be connected to a plurality of mobile terminals 100. Each module included in the communication unit 510 may include a plurality of modules.

The input unit 520 may include a camera 521, a microphone 522 or a user input unit 523 (e.g., a touch key, a push key, etc.). For example, the camera 521 may be used to detect a user attempting to use the airport robot 500. In this case, the camera 521 may also function as the sensing unit 540. The microphone 522 and the user input unit 523 may be used to receive input of requesting use of a service provided by the airport robot 500 from the user.

The sensing unit 540 may include one or more sensors for sensing at least one of internal information of the airport robot, the surrounding environment information of the airport robot and information on a user who uses the airport robot.

For example, the sensing unit 540 may include a proximity sensor 541 for detecting proximity of a user or an obstacle, a lidar sensor 542 for detecting the surrounding environment, an illumination sensor, a touch sensor, an acceleration sensor, a magnetic sensor, a motion sensor, an infrared sensor, an optical sensor (e.g., the camera 521), the microphone 522, etc. Meanwhile, the airport robot 500 may use a combination of the information sensed by at least two of the sensors.

The output unit 550 visually or audibly outputs information related to a service provided by the airport robot 500 and may include a display unit 551, a sound output unit 552, etc. The display unit 551 may have an inter-layered structure or an integrated structure with a touch sensor in order to facilitate a touch screen. The touch screen may provide an output interface between the airport robot 500 and a user, as well as function as the user input unit 523 which provides an input interface between the airport robot 500 and the user.

The motor 560 is used to move the airport robot 500 and may operate under control of the controller 580 to rotate wheels connected to the motor 560. As the wheels rotate, the airport robot 500 may move from one point to another point.

The memory 570 stores data supporting various functions of the airport robot 500. The memory 570 may store data and commands of a plurality of application programs executed in the airport robot 500. In addition, the memory 570 may receive and store a variety of data necessary to provide the service to the user of the airport robot 500 from the server 300.

The controller 580 may control operation of the components included in the airport robot 500. In particular, the controller 580 may control driving of the motor 560 to control movement of the airport robot 500. In addition, the controller 580 may receive a service provision request from the user of the airport robot 500 through the user input unit 523 and provide a service to the user in response to the received service provision request. The controller 580 may load data corresponding to the service provision request from the memory 570 or receive the data from the server 300. The controller 580 may provide the service to the user based on the loaded or received data. This will be described later.

The power supply unit 590 supplies power to the components of the airport robot 500. The power supply unit 590 may include a battery, and the battery may be an embedded battery or a replaceable battery Hereinafter, a method of connecting a mobile terminal with an airport robot according to an embodiment of the present invention will be described.

Figure 6:
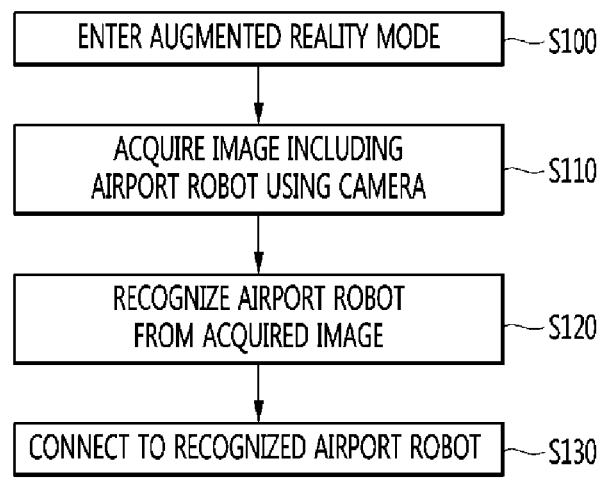
FIG. 6 is a flowchart illustrating operation of connecting a mobile terminal with an airport robot using augmented reality according to an embodiment of the present invention.

FIG. 6 is a flowchart illustrating operation of connecting a mobile terminal with an airport robot using augmented reality according to an embodiment of the present invention.

Referring to FIG. 6, the mobile terminal 100 may enter an augmented reality mode as an application supporting the augmented reality mode is executed (S100).

Specifically, the controller 180 may receive a request for executing the application supporting the augmented reality mode through the user input unit 123. In response to the received request for executing the application, the controller 180 may execute the application and display the execution screen of the application through the display unit 151.

The controller 180 may automatically enter the augmented reality mode as the application is executed. In some embodiments, the controller 180 may receive a request for entering the augmented reality mode through the user input unit 123 based on the execution screen of the application. The controller 180 may enter the augmented reality mode in response to the received request for entering the augmented reality mode.

The mobile terminal 100 may acquire an image including the airport robot 500 using the camera 121 included in the mobile terminal 100 as entering the augmented reality mode (S110).

In step S100, as described above, the controller 180 may enter the augmented reality mode supported by the application. Upon entering the augmented reality mode, the controller 180 may control the camera 121 to acquire an image. As described above in FIG. 3, the image acquired from the camera 121 may be a preview image. The controller 180 may display the image acquired from the camera 121 through the display unit 151.

The acquired image may include the appearance of the airport robot 500. For example, the appearance of the airport robot 500 included in the image may be the entire appearance or a partial appearance of one surface (e.g., a front surface, a side surface, a rear surface, etc.) of the airport robot 500. In contrast, ins some embodiments, if an identifier for recognizing the airport robot 500 is present on the appearance of the airport robot 500, the image may include a partial region of the airport robot 500 including the identifier.

The mobile terminal 100 may recognize the airport robot 500 from the acquired image (S120).

As described above in FIG. 3, the controller 180 may acquire information for identifying the airport robot 500, such as an identifier, or the image of the appearance of the airport robot 500 in the acquired image using an image recognition method. The controller 180 may recognize the airport robot 500 based on the acquired information.

The mobile terminal 100 may be connected to the airport robot 500 based on the result of recognition (S130).

The mobile terminal 100 may acquire a variety of information related to the airport robot 500 based on the result of recognizing the airport robot 500. The acquired information may include identification information of the airport robot 500 and connection information (e.g., the unique address of the airport robot 500) for connection with the airport robot 500.

The controller 180 may establish connection with the airport robot 500 using the acquired connection information. For example, the mobile terminal 100 and the airport robot 500 may be connected through a short-range wireless communication method such as Bluetooth or a wireless Internet method such as Wi-Fi.

When the mobile terminal 100 and the airport robot 500 are connected to each other, the airport robot 500 may provide the user with a menu screen related to services provided by the airport robot 500 or various user interfaces through the mobile terminal 100.

Figure 7A:
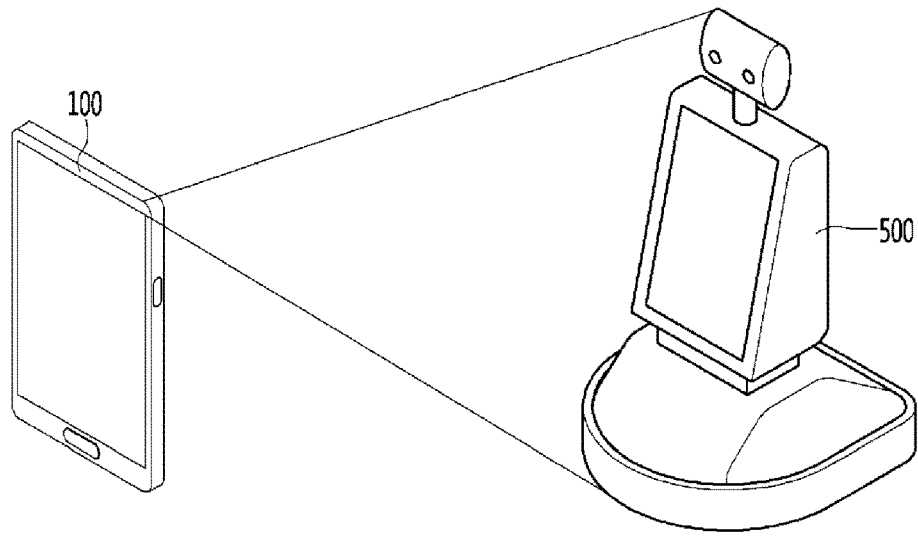
FIGS. 7A to 7B are views of operation of the mobile terminal shown in FIG. 5.
Figure 7B:
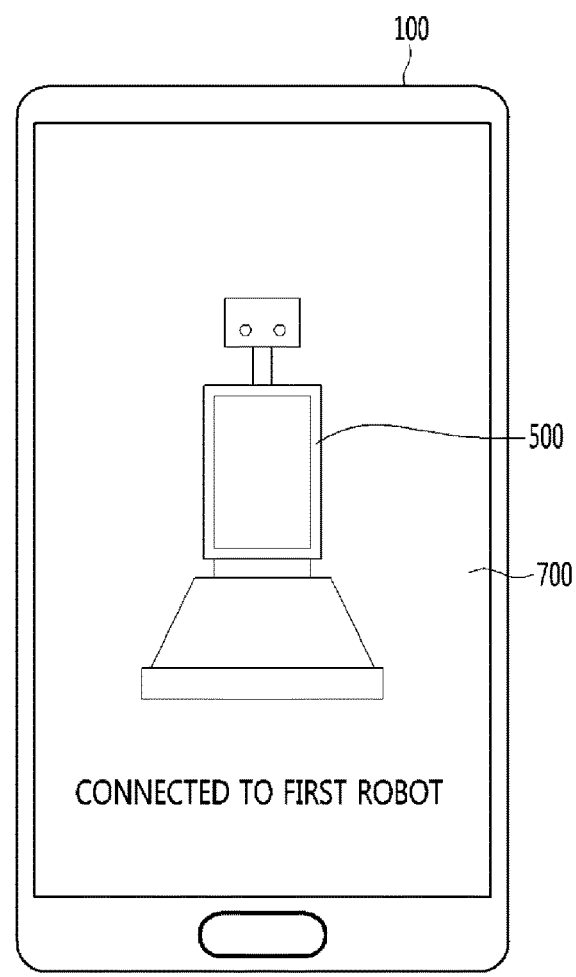

FIGS. 7a to 7b are views of operation of the mobile terminal shown in FIG. 5.

Referring to FIGS. 7a and 7b, when the mobile terminal 100 enters the augmented reality mode, the controller 180 may acquire the image (the preview image) using the camera 121. The camera 121 may acquire the image on the front side of a lens within a predetermined angle (an angle of view). When the user moves the camera 121 toward the airport robot 500, the camera 121 may acquire the image including the appearance of the airport robot 500.

The controller 180 may display the image 700 acquired from the camera 121 through the display unit 151. As shown in FIG. 7b, the image 700 may include at least a portion of the appearance of the airport robot 500.

The controller 180 may recognize the airport robot 500 included in the image 700 and perform connection operation with the recognized airport robot 500. For example, when the mobile terminal 100 and the airport robot 500 are connected through Bluetooth, the controller 180 may perform Bluetooth paring with the airport robot 500.

In some embodiments, when the mobile terminal 100 and the airport robot 500 are connected, the controller 180 may display a message indicating that connection with the airport robot 500 has been established through the display unit 151.

Although connection between the mobile terminal 100 and the airport robot 500 is described as being established after recognizing the airport robot 500 included in the image 700 in FIGS. 6 to 7b, the mobile terminal 100 and the airport robot 500 may be connected in advance in some embodiments. For example, if the mobile terminal 100 is connected to other electronic apparatuses or airport robots, the controller 180 may recognize to which of the currently connected electronic apparatuses or airport robots the airport robot 500 included in the image 700 corresponds. If the airport robot included in the image 700 is airport robot 500 #1 as the result of recognition, the controller 180 may display only information on the airport robot 500 #1 through the display unit 151 and may not display information on the other electronic apparatuses or airport robots.

Figure 8:
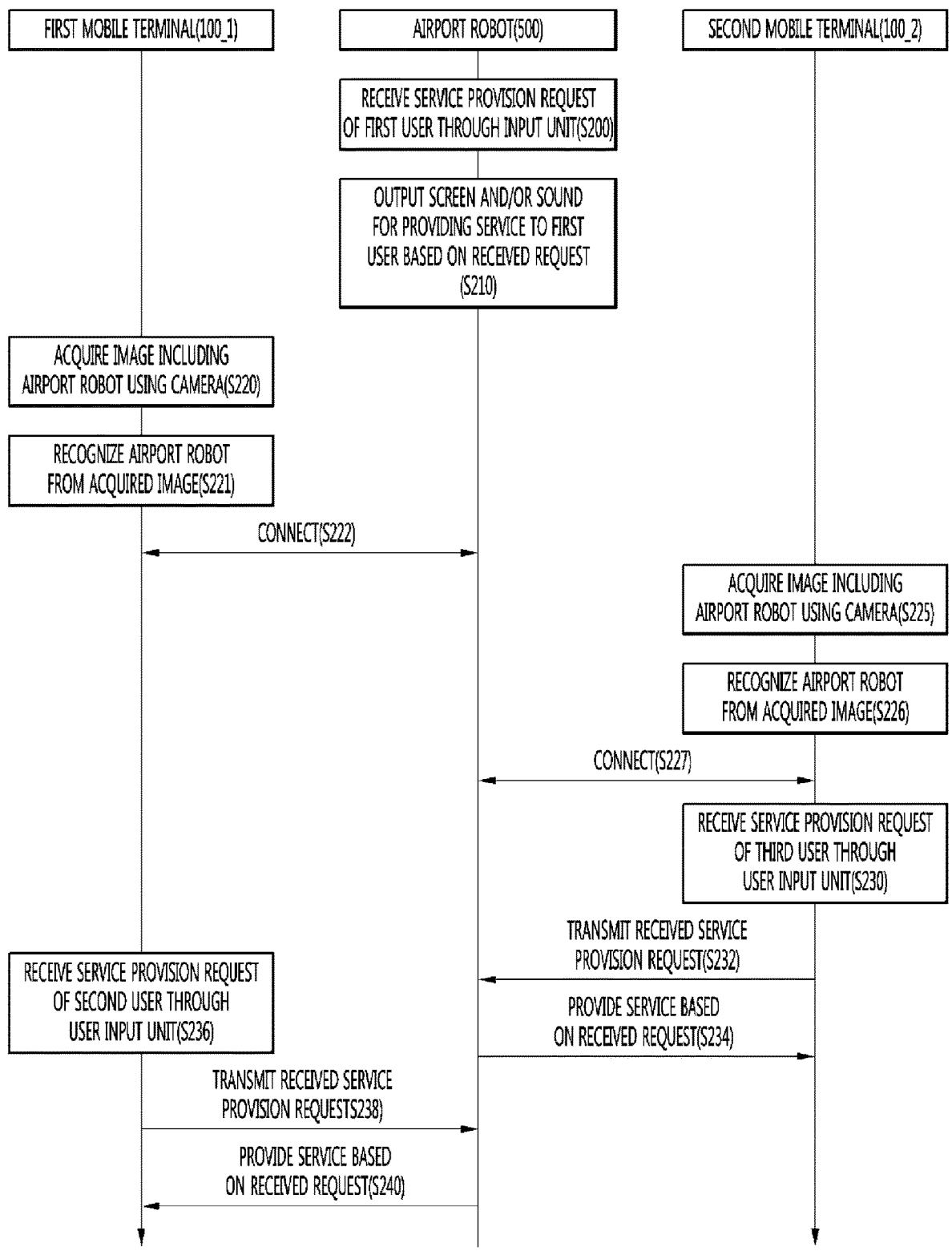
FIG. 8 is a ladder diagram showing operation in which an airport robot provides services to a plurality of mobile terminals according to the embodiment of the present invention.

FIG. 8 is a ladder diagram showing operation in which an airport robot provides services to a plurality of mobile terminals according to the embodiment of the present invention.

The number of airport robots installed in the airport to provide services may be limited due to costs. If the airport robots provide services only using displays or sound output units, the number of users who may simultaneously receive services from the airport robots may be limited. If the number of users attempting to use the airport robots increases, the users should wait for a long time to receive services through the airport robots. According to the embodiment of the present invention, the airport robot 500 may be implemented to simultaneously provide various services related to the airport to the plurality of users using an augmented reality method.

Referring to FIG. 8, the airport robot 500 may receive a service provision request of a first user through the input unit 520 (S200).

The first user may request to a desired service from the airport robot 500 using the input unit 520 such as the camera 521, the microphone 522 or the user input unit 523 (e.g., a touch screen, etc.).

The service is related to use of the airport and may include, for example, a route guidance service of a specific place or facility in the airport, a departure and arrival schedule guidance service of an airplane, a boarding time and gate guidance service based on the airplane ticket of a user. In addition, the service may include a service for providing a variety of multimedia content such as an image for causing interest of the user or an advertisement for providing useful information to the user. The type of the service is not limited to the services listed above and the services provided by the airport robot 500 may be more diverse in relation to the airport.

The airport robot 500 may output a screen and/or sound for providing the service to the first user based on the received request (S210).

The controller 580 of the airport robot 500 may acquire data corresponding to the request from the memory 570 or the server 300 in response to the service provision request received through the input unit 520. The controller 580 may visually output the acquired data through the display unit 551 or audibly output the acquired data through the sound output unit 552, thereby providing the service to the first user.

While the first user uses the airport robot 500, the first mobile terminal 100_1 of the second user may acquire the image including the airport robot 500 using the camera 121 (S220). The first mobile terminal 100_1 may recognize the airport robot 500 from the acquired image (S221) and establish connection with the recognized airport robot 500 (S222).

Steps S220 to S222 may be substantially equal or similar to steps S110 to S130 described in FIG. 6. Although not shown, the first mobile terminal 100_1 may further perform a step of entering the augmented reality mode before performing step S220.

While the first user uses the airport robot 500 and the first mobile terminal 100_2 of the second user is connected to the airport robot 500, a second mobile terminal 100_2 of a third user may acquire an image including the airport robot 500 using the camera 121 (S225). The second mobile terminal 100_2 may recognize the airport robot 500 from the acquired image (S226) and establish connection with the recognized airport robot 500 (S227). Steps S225 to S227 are substantially equal to steps S220 to S222 and thus a description thereof will be omitted.

That is, in steps S200 to S227, the first user may directly use the airport robot 500 and the second user and the third user may respectively connect the mobile terminals 100_1 and 100_2 to the airport robot 500 in order to use the airport robot 500 using augmented reality.

The second mobile terminal 100_2 may receive a service provision request of the third user through the user input unit 123 (S230) and transmit the received service provision request to the airport robot 500 (S232). The airport robot 500 may provide the service to the third user (S234), by transmitting, to the second mobile terminal 100_2, data for providing the service to the third user based on the received request.

The second mobile terminal 100_2 may display the data received from the airport robot 500 through the display unit 151. In particular, the controller 180 of the second mobile terminal 100_2 may display the received data on the image including the airport robot 500 using augmented reality.

That is, even while the first user receives the service using the airport robot 500, the third user may receive the service from the airport robot 500 using the mobile terminal 100_2.

Referring to FIG. 8 continuously, the first mobile terminal 100_1 may receive a service provision request of a second user through the user input unit 123 (S236) and transmit the received service provision request to the airport robot 500 (S238). The airport robot 500 may provide a service to the second user (S240), by transmitting, to the first mobile terminal 100_1, data for providing the service to the second user based on the received request.

That is, even while the first user receives the service using the airport robot 500 and the third user receives the service from the airport robot 500 using the mobile terminal 100_2, the second user may receive the service from the airport robot 500 using the mobile terminal 100_1. In addition, the services received from the airport robot 500 by the first to third users may be different.

Figure 9:
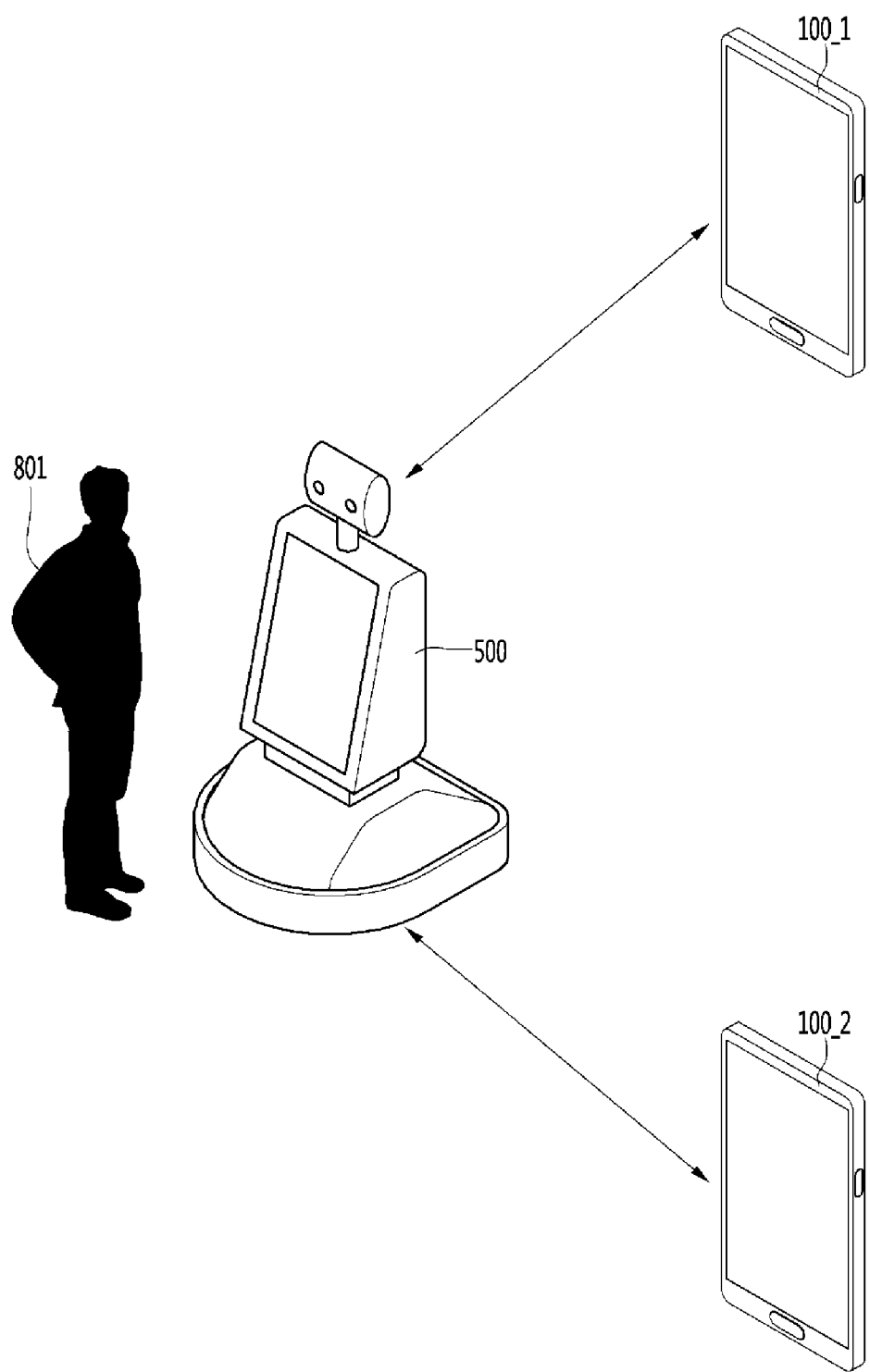
FIG. 9 is a view showing operation in which an airport robot provides services to a plurality of users according to the embodiment shown in FIG. 8.

FIG. 9 is a view showing operation in which an airport robot provides services to a plurality of users according to the embodiment shown in FIG. 8.

Referring to FIG. 9, while a first user 801 uses the airport robot 500, a second user may receive a service from the airport robot 500 using a first mobile terminal 100_1. In addition, a third user may receive a service from the airport robot 500 using a second mobile terminal 100_2. In particular, the mobile terminal 100_1 or 100_2 may be connected to the airport robot 500 using augmented reality and receive the service from the airport robot 500 using augmented reality.

The mobile terminal 100 may be connected to the airport robot 500 using any one of various wireless connection methods. For example, the mobile terminal 100 may set an optimal connection method with the airport robot 500 based on traffic, a communication distance, a communication speed, etc. of each connection method. The mobile terminal 100 and the airport robot 500 may be connected using the set connection method. Embodiments related thereto will be described with reference to FIGS. 10a to 10c.

Figure 10A:
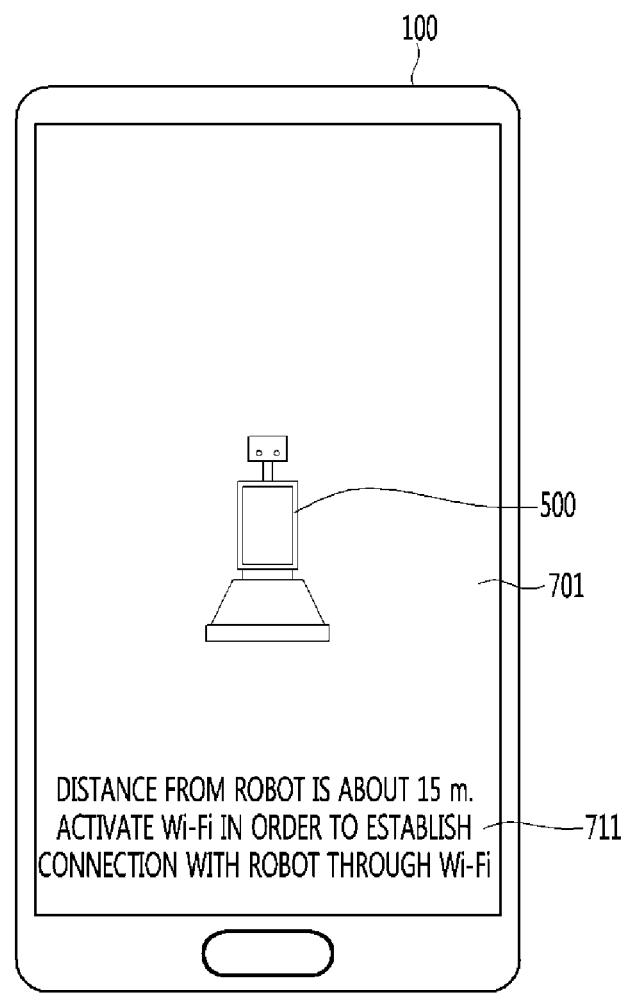
FIGS. 10A to 10C are views related to operation of setting a connection method between a mobile terminal and an airport robot.
Figure 10B:
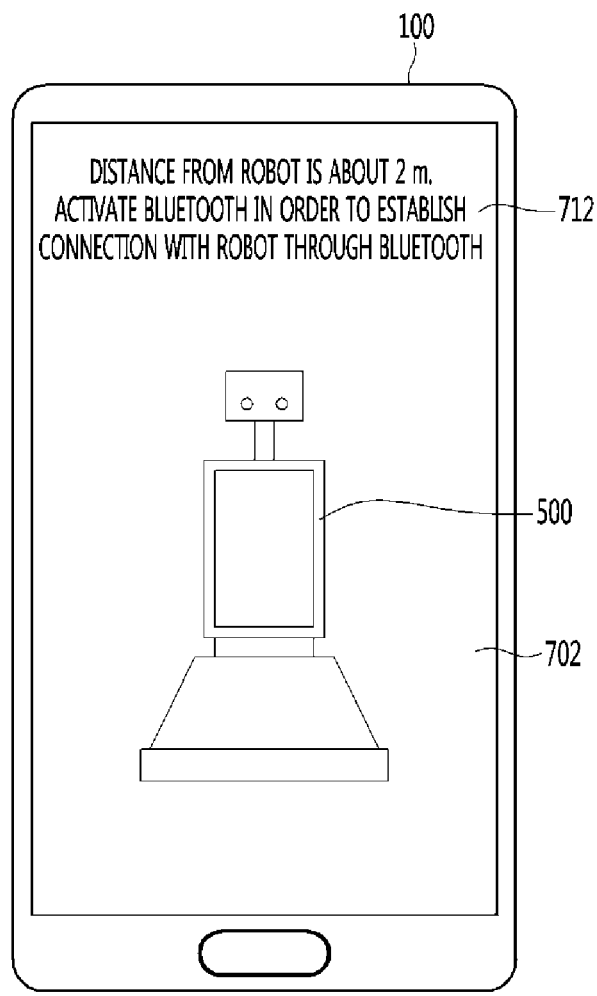
Figure 10C:
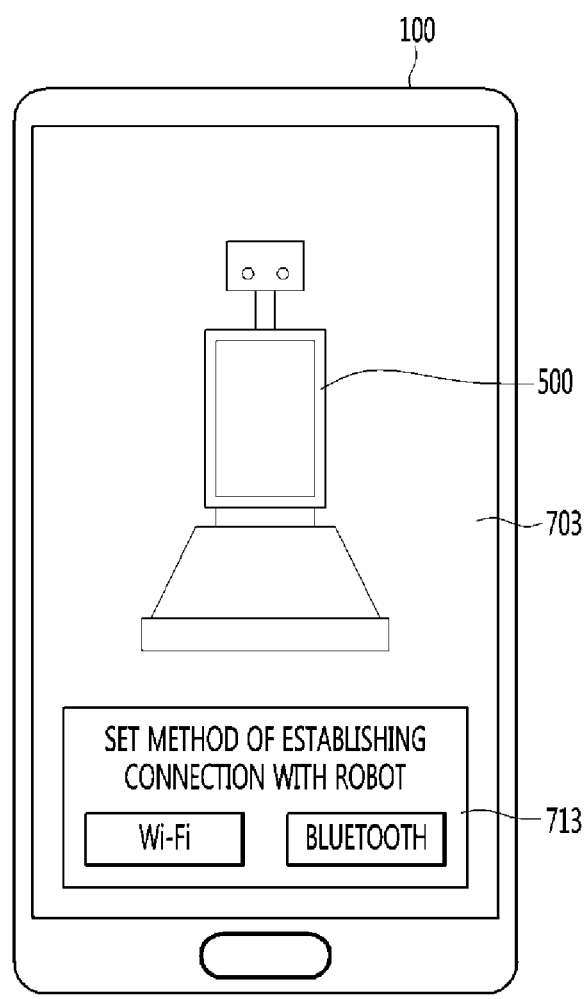

FIGS. 10a to 10c are views related to operation of setting a connection method between a mobile terminal and an airport robot.

Referring to FIGS. 10a and 10b, the controller 180 of the mobile terminal 100 may display the image 701 or 720 including the airport robot 500 acquired from the camera 121 through the display unit 151. When the airport robot 500 is captured at a long distance, the size of the airport robot 500 included in the image 701 may be relatively small. In contrast, when the airport robot 500 is captured at a small distance, the size of the airport robot 500 included in the image 702 may be relatively large.

The controller 180 may calculate a distance between the airport robot 500 included in the image 701 or 702 and the mobile terminal 100. For example, the controller 180 may calculate the distance based on the size of the airport robot 500 included in the image 701 or 702. Alternatively, the controller 180 may calculate the distance from the airport robot 500 based on depth information acquired from a depth pixel included in an image sensor of the camera 121.

The controller 180 may set the connection method between the mobile terminal 100 and the airport robot 500 based on the result of calculating the distance between the mobile terminal 100 and the airport robot 500. In some embodiments, the controller 180 may display a message 711 including information on the distance from the robot and/or information on the set connection method on the image 701 or 702.

For example, as shown in FIG. 10a, if the distance between the mobile terminal 100 and the airport robot 500 is about 15 m, the controller 180 may set the method of connecting the mobile terminal 100 with the airport robot 500 to Wi-Fi. If the Wi-Fi function of the mobile terminal 100 is activated, the controller 180 may automatically establish connection between the mobile terminal 100 and the airport robot 500 using Wi-Fi. In contrast, if the Wi-Fi function of the mobile terminal 100 is deactivated, the controller 180 may display a message for requesting activation of Wi-Fi or automatically activate Wi-Fi. Wi-Fi may include a Wi-Fi Direct communication method.

Meanwhile, as shown in FIG. 10b, if the distance between the mobile terminal 100 and the airport robot 500 is about 2 m, the controller 180 may set the method of connecting the mobile terminal 100 with the airport robot 500 to Bluetooth. If the Bluetooth function of the mobile terminal 100 is activated, the controller 180 may automatically establish connection between the mobile terminal 100 and the airport robot 500 using Bluetooth. In contrast, if the Bluetooth function of the mobile terminal 100 is deactivated, the controller 180 may display a message for requesting activation of Bluetooth or automatically activate Bluetooth.

In some embodiments, the controller 180 may receive and set the connection method between the mobile terminal 100 and the airport robot 500 from the user.

Referring to FIG. 10c, the controller 180 may display a setting window 713 for setting any one of connection methods currently usable between the mobile terminal 100 and the airport robot 500 on the image 703. The controller 180 may receive input of selecting any one connection method through the user input unit 123. The controller 180 may establish connection between the mobile terminal 100 and the airport robot 500 using the selected connection method.

Figure 11:
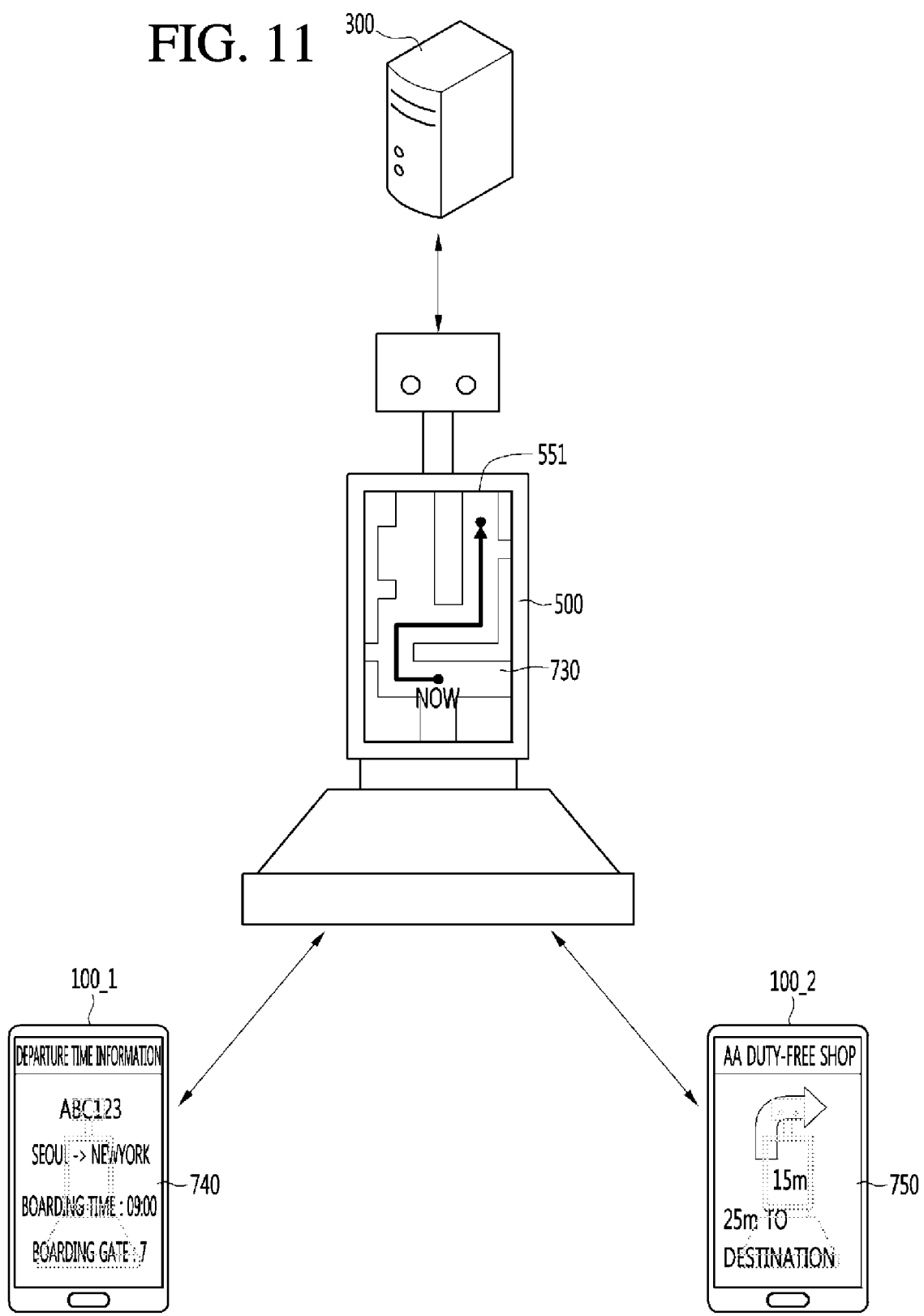
FIGS. 11 and 12 are diagrams showing various embodiments of a screen displayed according to services provided by an airport robot.
Figure 12:
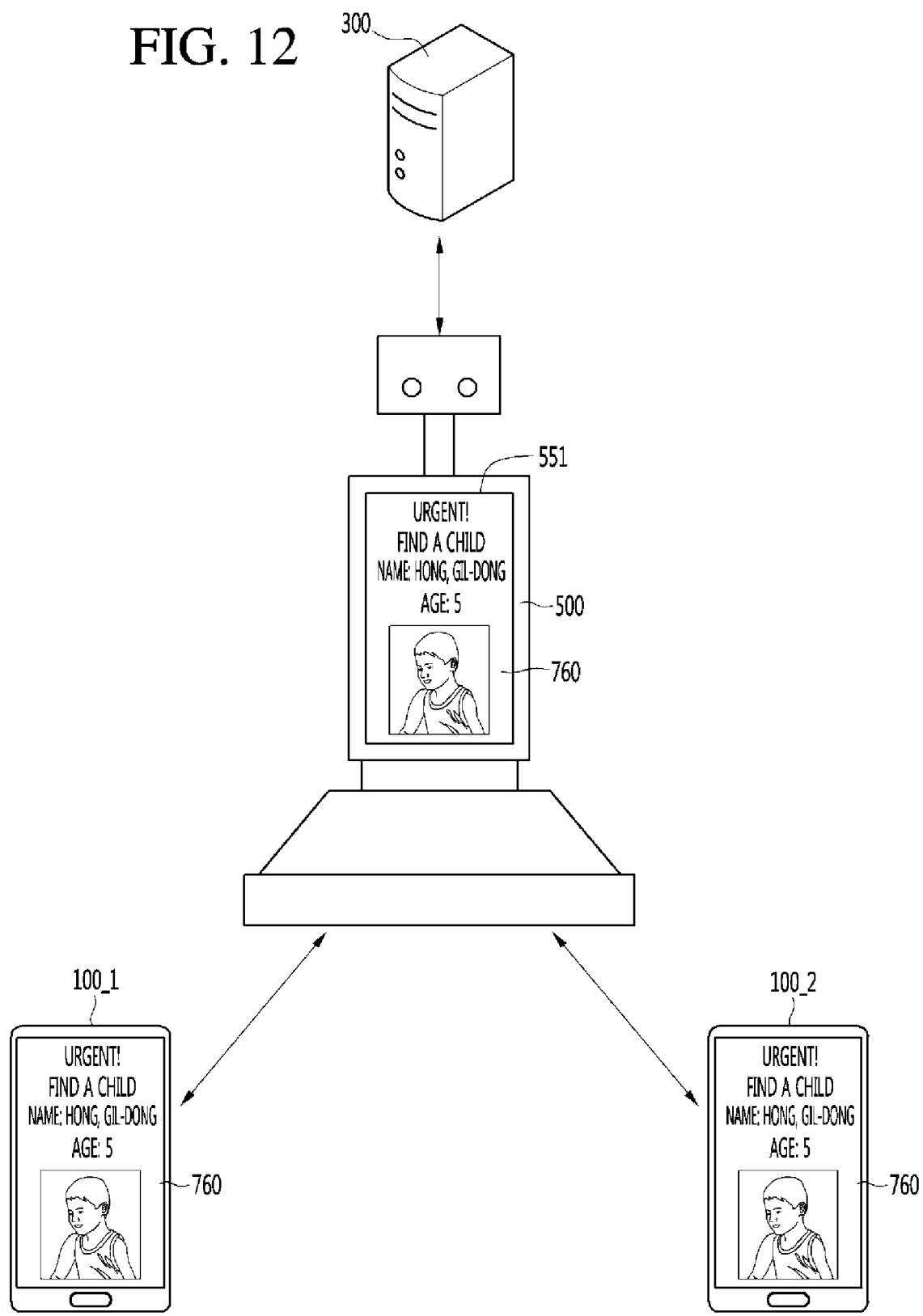

FIGS. 11 and 12 are diagrams showing various embodiments of a screen displayed according to services provided by an airport robot.

Referring to FIG. 11, the airport robot 500 may provide a service to a first user 801 using the input unit 520 and the output unit 550. In addition, the airport robot 500 may provide services to a first mobile terminal 100_1 and a second mobile terminal 100_2 connected through the communication unit 510.

For example, the controller 580 may display a guide screen 730 for route guidance to a destination through the display unit 551 in response to a route guidance service provision request of the first user 801.

At the same time, the controller 580 may receive a request for providing information on an airplane to be boarded by the second user from the first mobile terminal 100_1. The controller 580 may transmit, to the first mobile terminal 100_1, departure time information including information on a boarding time and gate of the airplane to be boarded by the second user in response to the received information provision request. The controller 180 of the first mobile terminal 100_1 may display a departure time information screen 740 including the information on the boarding time and the boarding gate on the image including the airport robot 500 based on the received departure time information.

In addition, the controller 580 may receive a route guidance service provision request to "AA duty-free shop" from the second mobile terminal 100-2. The controller 580 may transmit route guidance information from a current position to "AA duty-free shop" to the second mobile terminal 100_2 in response to the received route guidance service provision service. The controller 180 of the second mobile terminal 100_2 may display a guidance screen 750 based on the received route guidance information on the image including the airport robot 500.

That is, according to the embodiment shown in FIG. 11, the airport robot 500 may simultaneously provide different services to a plurality of users. Accordingly, even when the number of airport robots disposed in the airport is limited, the plurality of users in the airport can receive services of the airport robot using augmented reality.

Referring to FIG. 12, when an urgent or important event (fire, terror, missing child, boarding time change, airplane cancellation, airplane delay, major news, etc.) occurs, the airport robot 500 may notify the plurality of users of the event.

The controller 580 of the airport robot 500 may output information on the occurred event through the output unit 550. In addition, the controller 580 may transmit the information on the occurred event to the mobile terminals 100_1 and 100_2 connected to the airport robot 500. The controller 180 of the mobile terminal 100_1 or 100_2, which has received the information, may output the received information through the output unit 150.

Referring to FIG. 12, when a child is lost in the airport, the server 300 may transmit information on an event, in which a child is lost, to the airport robot 500. The controller 580 of the airport robot 500 may display an event notification screen 760 including the received information through the display unit 551 or the sound output unit 552.

The controller 580 may transmit the information on the event of the missing child, which has been received from the server 300, to the first mobile terminal 100_1 and the second mobile terminal 100_2 connected to the airport robot 500. The controller of each of the first mobile terminal 100-1 and the second mobile terminal 100_2 may display the event notification screen 760 including the information on the event of the missing child through the display unit or the audio output unit.

That is, according to the embodiment shown in FIG. 12, if an urgent or important occurs inside or outside the airport, the airport robot 500 may output information on the event through the output unit 550 and a plurality of connected mobile terminals. Therefore, the airport robot 500 may efficiently notify the users of the urgent or important event.

The invention can also be embodied as computer readable codes on a computer readable recording medium. The computer readable recording medium is any data storage device that can store data which can be thereafter read by a computer system. Examples of the computer readable recording medium include hard disk drives (HDDs), solid state disks (SSDs), silicon disk drive (SDDs), read-only memories (ROMs), random-access memories (RAMs), CD-ROMs, magnetic tapes, floppy disks, optical data storage devices, and carrier waves (such as data transmission through the Internet). The computer may include the controller 180 of the terminal.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

A first object of the present invention devised to solve the problem lies in an airport robot capable of simultaneously providing airport related services to a plurality of users.

A second object of the present invention devised to solve the problem lies in a method of conveniently connecting a mobile terminal to an airport robot in order to receive a service from the airport robot through the mobile terminal.

A third object of the present invention devised to solve the problem lies in an airport robot capable of efficiently notifying a plurality of users of an urgent or important event occurring in an airport.

According to an aspect for achieving the first object, an airport robot may receive a first service provision request from a first user through a user input unit and display first data for providing a first service through a display unit. In addition, the airport robot may receive a second service provision request from a first mobile terminal of a second user and transmit second data for providing a second service to the first mobile terminal, thereby simultaneously providing services to the first user and the second user.

In order to achieve the second object, when an image including the airport robot is acquired by a camera of the first mobile terminal, connection between the airport robot and the first mobile terminal may be established.

According to another aspect for achieving the second object, an airport robot may establish connection with a second mobile terminal of a third user while providing a first service or a second service. The airport robot may transmit third data for providing a third service to the second mobile terminal in response to a third service provision request received from the second mobile terminal.

In order to achieve the third object, the airport robot may receive information on an urgent event occurring in an airport from a server connected to the airport robot while providing at least one of the first to third services. The airport robot may display the received information through a display unit and transmit the received information to the first mobile terminal and the second mobile terminal.

According to an embodiment of the present invention, an airport robot is connected with the mobile terminals of a plurality of users to simultaneously provide airport related services to the plurality of users.

According to an embodiment of the present invention, a user can conveniently establish connection with an airport robot and receive airport related services from the connected airport robot, by acquiring an image including the airport robot using augmented reality.

According to an embodiment of the present invention, an airport robot can efficiently notify a plurality of users of an urgent or important event occurring in an airport.

The invention claimed is:

1. A mobile terminal comprising:
a camera configured to acquire an image including a robot;
a display configured to display the image acquired by the camera;
a user input configured to receive a service provision request related to receiving a service from the robot; and
a controller configured to:
establish a connection with the robot based on determining that the image includes the robot,
transmit the received service provision request to the robot via the connection,
receive, from the robot, data related to the service from the robot and corresponding to the service provision request, and
control the display to display the received data in connection with the image,
wherein the controller further:
calculates a distance from the robot based on the image including the robot,
selects one of a plurality of types of wireless connections with the robot based on the calculated distance, and
establishes the connection with the robot based on the selected one of the plurality of types of wireless connections.

2. The mobile terminal according to claim 1, further comprising a memory having stored therein an application supporting an augmented reality mode,
wherein the controller further:
enters the augmented reality mode as the application is executed,
acquires the image including the robot using the camera upon entering the augmented reality mode,
recognizes the robot from the acquired image, and
establishes the connection with the robot based on recognizing the robot from the acquired image.

3. The mobile terminal according to claim 1, wherein the controller further:
receives information related to an urgent event from the robot, and
displays the received information through the display.

4. The mobile terminal according to claim 1, wherein the service received from the robot includes at least one of:
a route guidance service of a specific place or facility in an airport,
a departure and arrival schedule guidance service of an airplane, a boarding guidance service based on an airplane ticket of a user, or
a multimedia content provision service.

* * * * *